Sept. 1, 1936.　　　J. D. TUCKER　　　2,052,587
SINGLE CUTTER DIE
Filed Oct. 23, 1934
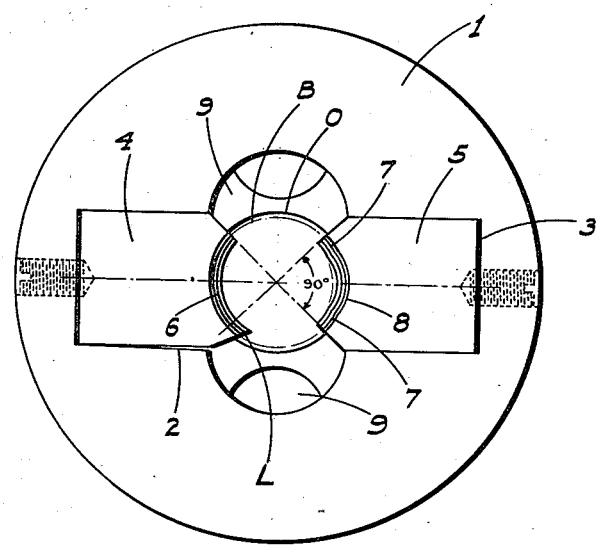
INVENTOR
J. D. Tucker
BY
ATTORNEY Patented Sept. 1, 1936

2,052,587

UNITED STATES PATENT OFFICE 2,052,587

SINGLE CUTTER DIE

Jesse D. Tucker, Sacramento, Calif., assignor to Tucker-Gilmore Mfg. Co., Sacramento, Calif., a corporation Application October 23, 1934, Serial No. 749,528

2 Claims. (Cl. 10—111)

This invention relates to threading cutting tools and particularly to dies.

The principal object of my invention is to provide a die of this character constructed with a single cutting face, which extends over a relatively long arc. By this construction said cutting face and of course the threads thereon are sturdier than is the case with the ordinary die so that breakage is practically eliminated; the die is easier to resharpen on account of the fact that there is only one lip or leading edge; the cutting action is easier and appears to have less tendency to bind both when advancing and backing off the die from the member being threaded; and last but by no means least the threads will be cut accurately, as to the proper number per inch on the bolt or other part (otherwise known as lead), regardless of the length of the threading on such part.

This is a feature which cannot be depended upon with the ordinary dies and it is a common occurrence to find that the number of threads on the bolt etc. varies (usually an increase) one or more over what should be the case in every two inches or so in the length of the part being threaded. With such conditions it is of course impossible that a nut etc. will probably engage this threaded part and binding of the nut and ultimate stripping of the threads results.

With this principle (a single cutter die) it is possible to have a greater lip on the cutter, which makes for smooth and easy cutting.

In the ordinary multiple cutter die on the other hand any appreciable amount of lip is almost prohibited on account of the fact that each of the cutting faces must have resistance in order to keep the bolt etc. central, and to prevent one cutting edge from cutting heavier than the others, or doing practically all the cutting, and which would result in an oversize or undersize cut being made. With my single cutter die, these troubles are eliminated.

A further object of the invention is to produce a simple and inexpensive device and yet one which will be exceedingly effective for the purpose for which it is designed.

These objects I accomplish by means of such structure and relative arrangement of parts as will appear by a perusal of the following specification and claims.

The figure on the drawing is a front face view of my improved die.

The body of the die is a cylindrical member 1 adapted to fit in and be engaged by a chuck or stock in the usual manner, said body being provided with a central axially disposed opening O. Mounted in sockets 2 and 3 and disposed in the body in diametrally opposed and symmetrical relation to the axis of the opening O are cutting and steady rest blocks 4 and 5 respectively.

The blocks are arranged for limited radial adjustment in the body in the usual manner and the block 4 only is capable also of limited lateral rocking or tilting movement in its socket in the direction of its leading side; the adjacent face of the socket diverging slightly from the back of the block as shown in the drawing.

The inner face of the cutter block 4 is formed with thread sections 6 which gradually increase in depth along the block as is common practice, so that the threads as cut in the bolt etc. will be gradually increased to the full depth from the inception of the cut.

The radius of the thread sections is the same as that of the bolt B to be threaded, but the thread arc is disposed slightly eccentric to the axis of the bolt and die opening as shown, said arc diverging from the leading to the following edge of the cutter relative to the bolt circle.

The adjacent face of the opposed rest block 5 is threaded concentric with the axis of the body opening and bolt as at 7, but these threads are relieved in the central portion of the block as shown at 8. This prevents any possible rocking of the steady rest block 5 relative to the bolt, and insures that the end portions of the threads 7 will form steady rest stools. The threads 7 increase in depth from the outer end of the block 5 in the same manner as the threads 6, and are in position to properly cooperate with the threads 6 so that they will enter the thread grooves in the bolt as cut by said threads 6. It is to be understood however that said threads 7 are not cutting but guide threads only, having a close fit with the cut threads. This maintains the threads as cut in perfect alinement, and counteracts any tendency of such thread to lead.

The inner face of the block 5 is substantially 90° in arcuate extent from end to end while the threads of the cutter block are of slightly greater arcuate extent, the increases in such extent relative to the diametral line of the body centrally through the blocks being at the leading end or lip L of the threads. This provides for a generous amount of resharpening of this lip without reducing the actual length of the thread arc an undesired amount. The body 1 between the blocks is of course recessed or relieved as at 9 for the escape of the chips or cuttings.

When the die is engaged with a bolt B to be threaded, the latter is supported against lateral deflection at a point directly opposed to the lip L by the corresponding steady-rest threads 7 of the block 5. The threads 6 on the block 4 being disposed eccentric relative to the bolt, have clearance with the bolt threads and grooves as cut and there is no chance for the threads to bind in the thread grooves being formed and easy turning of the die is promoted. The use of a single relatively long cutting face gives it such strength that breaking of the same is prevented, and I am able to provide the cutter with the desired large amount of lip, which promotes smooth and easy cutting.

A backward tilting of the cutter block (relative to the direction of advancing rotation of the die) facilitates backing off the die from the bolt, since the cutter block by reason of the frictional contact of its threads with the thread grooves of the bolt, then tilts and shifts the lip and the threads as a whole slightly in a direction such that the close cutting fit of the cutter threads in the thread grooves of the bolt is relieved so that the frictional resistance to the backing off of the die is reduced considerably.

Also, the trailing end of the threads is shifted inwardly so that said threads scrape the shavings from the thread grooves in the bolt, and the danger of the threads becoming clogged with shavings is eliminated.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A thread cutting die, comprising a body having a central opening, cutting and steady rest blocks mounted in the body in diametrally opposed relation to each other on opposite sides of the opening, cutting thread sections cut continuously along the inner face of the cutting block, and non-cutting guide threads to cooperate with the cutting threads formed in the inner face of the steady rest block concentric with the axis of the opening; the threads of the steady rest block being relieved intermediate their ends.

2. A threaded cutting die comprising a body having a central opening, cutting and steady rest blocks mounted in the body in diametrally opposed relation on opposite sides of the opening, the inner face of the steady rest block being curved to follow the contour of a part to be threaded and the inner face of the cutting block having continuous thread sections cut along its inner face; the arcuate extent of the threaded face of the cutting block being greater than that of the inner face of the steady rest block, the increase in extent, relative to a line drawn diametrally through the axis of the body opening and symmetrically of the blocks, being at the leading end of the threads, whereby to provide a relatively sharp and long cutting lip.

JESSE D. TUCKER.